(12) United States Patent  
Schwarzapel et al.

(10) Patent No.: US 9,544,771 B2  
(45) Date of Patent: Jan. 10, 2017

(54) SERVICES ACCESS FOR MOBILE DEVICES

(71) Applicant: Yahoo! Inc., Sunnyvale, CA (US)

(72) Inventors: Josh Schwarzapel, San Mateo, CA (US); Dylan Casey, Menlo Park, CA (US); Lovlesh Chhabra, San Jose, CA (US); Atte Lahtiranta, Cupertino, CA (US); Jon Hryn, Cary, NC (US); Daniel Hopkins, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 14/454,713

(22) Filed: Aug. 7, 2014

(65) Prior Publication Data

US 2016/0044509 A1   Feb. 11, 2016

(51) Int. Cl.
*H04W 8/26* (2009.01)
*H04W 12/06* (2009.01)
*H04W 4/06* (2009.01)

(52) U.S. Cl.
CPC ............ *H04W 12/06* (2013.01); *H04W 4/06* (2013.01)

(58) Field of Classification Search
None
See application file for complete search history.

(56) References Cited

U.S. PATENT DOCUMENTS

| | | | | |
|---|---|---|---|---|
| 8,655,313 B2 * | 2/2014 | Agevik | ............... | H04L 63/126 455/410 |
| 9,084,071 B2 * | 7/2015 | Lisboa | .................... | H04W 4/00 |
| 2003/0018726 A1 * | 1/2003 | Low | ........ | H04L 12/581 709/206 |
| 2006/0143098 A1 * | 6/2006 | Lazaridis | ............... | G06Q 30/04 705/34 |
| 2006/0240824 A1 * | 10/2006 | Henderson | ............ | H04L 12/581 455/435.1 |
| 2006/0258341 A1 * | 11/2006 | Miller | ..................... | H04L 67/16 455/414.1 |
| 2007/0294359 A1 * | 12/2007 | Kao | ........................ | H04L 51/04 709/207 |
| 2008/0046435 A1 * | 2/2008 | Watson | ............... | G06F 17/3089 |
| 2008/0216153 A1 * | 9/2008 | Aaltonen | ................ | G06F 21/31 726/3 |
| 2009/0187831 A1 * | 7/2009 | Tiwana | ................ | G06Q 10/107 715/752 |
| 2011/0059727 A1 * | 3/2011 | Lisboa | .................... | H04W 4/00 455/414.1 |
| 2011/0130126 A1 * | 6/2011 | Friman | .................. | G06Q 20/10 455/414.1 |
| 2012/0144464 A1 | 6/2012 | Fakhrai et al. | | |
| 2013/0217361 A1 * | 8/2013 | Mohammed | .......... | H04W 12/06 455/411 |
| 2014/0052638 A1 | 2/2014 | Chung et al. | | |
| 2014/0074941 A1 * | 3/2014 | He | ........................ | H04L 51/046 709/206 |
| 2014/0095638 A1 * | 4/2014 | Chen | .................... | H04L 51/046 709/206 |

OTHER PUBLICATIONS

Notification of Transmittal of the International Search Report and the Written Opinion of the International Searching Authority, or the Declaration, App. No. PCT/US2015/044099, Filed Aug. 6, 2015, Mailed Nov. 18, 2015, 13 Pages.

* cited by examiner

*Primary Examiner* — Kimberly A Williams
(74) *Attorney, Agent, or Firm* — Berkeley Law & Technology Group, LLP

(57) ABSTRACT

Briefly, embodiments of methods and/or systems of services access through progressive registration via a mobile device.

14 Claims, 3 Drawing Sheets

SERVICES ACCESS FOR MOBILE DEVICES

BACKGROUND

1. Field

The present disclosure relates generally to accessing services using, for example, mobile devices and, more particularly, to use of individual-specific parameters to permit access to sets of Internet services by mobile devices.

2. Information

At times, entering passwords, user IDs, and/or other parameters for the purposes of obtaining access to applications operating on mobile devices, such as mobile "smart phones," for example, may be particularly problematic. For example, if a mobile device user seeks to gain access to an Internet-type service, such as an e-mail account, an instant messaging capability, a shared calendar, etc., a user may be required to enter a username and/or password each time the user accesses the service. In many instances, manipulating a touchscreen display, for example, on a small, handheld mobile device each time, for example, a user seeks to make use of an Internet service may represent a time-consuming and/or unproductive endeavor.

However, although mobile device users may feel that entering and reentering passwords may represent a nuisance, many mobile device users continue to utilize usernames, passwords, and/or other security measures to hinder unscrupulous others from gaining access to particular applications and/or personal files. Thus, especially in view of the proliferation of application programs for use with handheld mobile devices, less-intrusive security and/or authentication measures continue to gain favor.

BRIEF DESCRIPTION OF DRAWINGS

Claimed subject matter is particularly pointed out and/or distinctly claimed in the concluding portion of the specification. However, both as to organization and/or method of operation, together with objects, features, and/or advantages thereof, claimed subject matter may be understood by reference to the following detailed description if read with the accompanying drawings in which:

Figure 1:
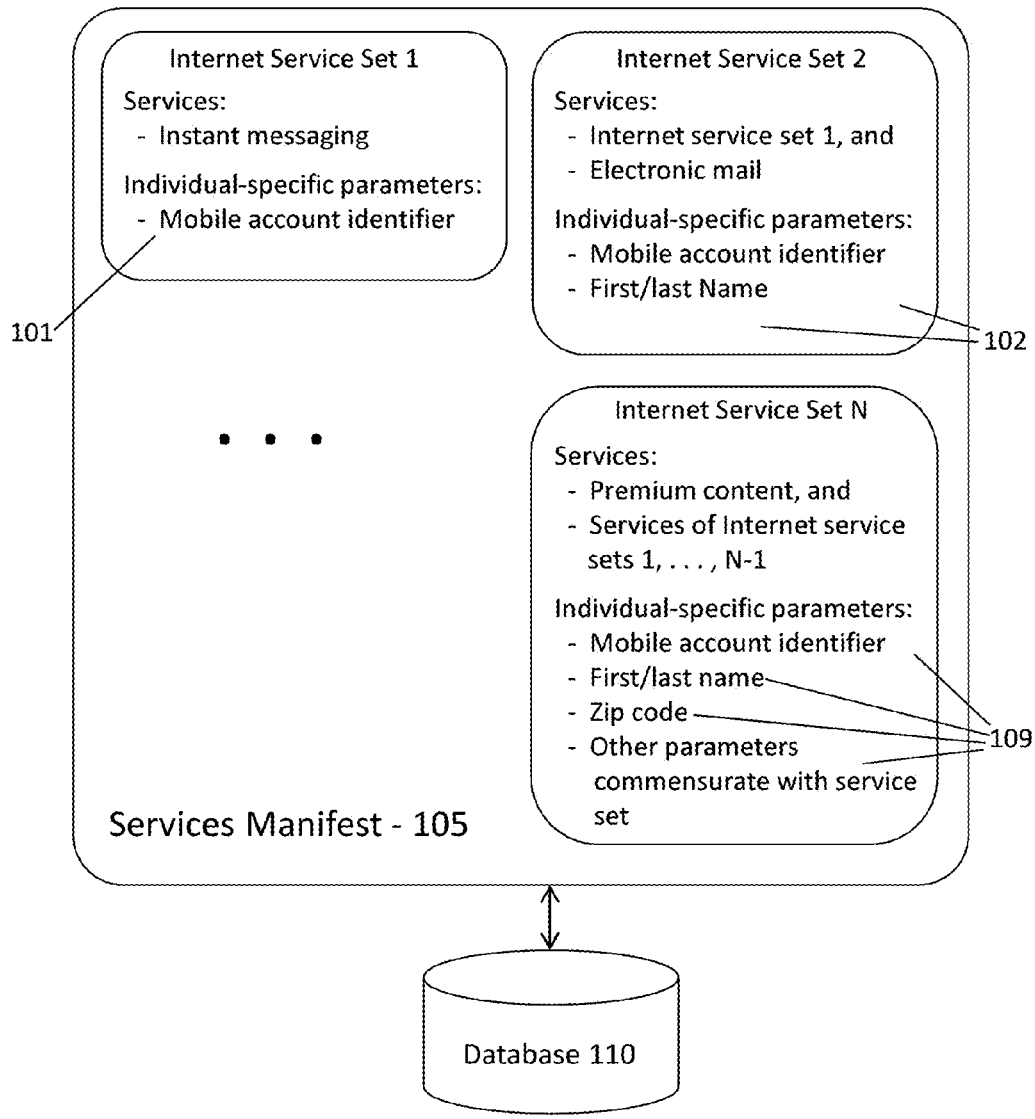
FIG. 1 is a schematic illustration of a services manifest showing Internet service sets and individual-specific parameters, including commensurate parameters, according to an embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. For purposes of explanation, specific numbers, systems, and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes, and/or equivalents may occur to those skilled in the art. It is, therefore, to be understood that appended claims are intended to cover any and all modifications and/or changes as fall within claimed subject matter.

Reference throughout this specification to one implementation, an implementation, one embodiment, an embodiment and/or the like may mean that a particular feature, structure, or characteristic described in connection with a particular implementation or embodiment may be included in at least one implementation or embodiment of claimed subject matter. Thus, appearances of such phrases, for example, in various places throughout this specification are not necessarily intended to refer to the same implementation or to any one particular implementation described. Furthermore, it is to be understood that particular features, structures, or characteristics described may be combined in various ways in one or more implementations. In general, of course, these and other issues may vary with context. Therefore, particular context of description or usage may provide helpful guidance regarding inferences to be drawn.

Operations and/or processing, such as in association with networks, such as communication networks, for example, may involve physical manipulations of physical quantities. Typically, although not necessarily, these quantities may take the form of electrical and/or magnetic signals or states capable of, for example, being stored, transferred, combined, processed, compared, and/or otherwise manipulated. It has proven convenient, at times, principally for reasons of common usage, to refer to these signals as bits, data, values, elements, symbols, characters, terms, numbers, numerals, and/or the like. It should be understood, however, that all of these or similar terms are to be associated with appropriate physical quantities and are intended to merely be convenient labels.

In this context, the terms "coupled," "connected," and/or similar terms, may be used. It should be understood that these terms are not intended as synonyms. Rather, "connected" may be used to indicate that two or more elements or other components, for example, are in direct physical and/or electrical contact; while, "coupled" may mean that two or more components are in direct physical or electrical contact; however, "coupled" may also mean that two or more components are not in direct contact, but may nonetheless co-operate or interact. The term "coupled" may also be understood to mean indirectly connected, for example, in an appropriate context.

The terms, "and," "or," "and/or," and/or similar terms, as used herein, may include a variety of meanings that also are expected to depend at least in part upon the particular context in which such terms are used. Typically, "or" if used to associate a list, such as A, B, or C, is intended to mean A, B, and C, here used in the inclusive sense, as well as A, B, or C, here used in the exclusive sense. In addition, the term "one or more" and/or similar terms may be used to describe any feature, structure, and/or characteristic in the singular and/or may be used to describe a plurality or some other combination of features, structures and/or characteristics. In this context, the term "between" and/or similar terms are understood to include "among" if appropriate for the particular usage. Likewise, in this context, the terms "compatible with," "comply with" and/or similar terms are understood to include substantial compliance or substantial compatibility. Though it should be noted that these are merely illustrative examples and claimed subject matter is not limited to this example.

The terms "network device" may refer to any device capable of communicating via and/or as part of a network. Network devices may be capable of sending and/or receiving signals (e.g., signal packets), such as via a wired or wireless network, may be capable of performing arithmetic and/or logic operations, processing and/or storing signals, such as in memory as physical memory states, and/or may, for example, operate as a server. Network devices capable of operating as a server, or otherwise, may include, as examples, dedicated rack-mounted servers, desktop computers, laptop computers, set top boxes, tablets, netbooks, smart phones, integrated devices combining two or more features of the foregoing devices, the like or any combination thereof.

It should be understood that for ease of description, a network device may be embodied and/or described in terms of a computing device. However, it should further be understood that this description should in no way be construed that claimed subject matter is limited to one embodiment, such as a computing device or a network device, and, instead, may be embodied as a variety of devices or combinations thereof, including, for example, one or more illustrative examples.

A network may comprise two or more network devices and/or may couple network devices so that signal communications, such as in the form of signal packets, for example, may be exchanged, such as between a server and a client device and/or other types of network devices, including between wireless devices coupled via a wireless network, for example. It is noted that the terms, server, server device, server computing device, server computing platform, and/or similar terms are used interchangeably. While in some instances, for ease of description, these terms may be used in the singular, such as by referring to a "client device," "mobile device," or a "server device," the description is intended to encompass one or more mobile devices, one or more client devices, or one or more server devices, as appropriate. Along similar lines, references to a "database" are understood to mean, one or more databases and/or portions thereof, as appropriate.

A network may also include now known, or to be later developed arrangements, derivatives, and/or improvements, including, for example, past, present and/or future mass storage, such as network attached storage (NAS), a storage area network (SAN), and/or other forms of computer and/or machine readable media, for example. A network may include the Internet, one or more local area networks (LANs), one or more wide area networks (WANs), wire-line type connections, wireless type connections, other connections, and/or any combination thereof. Thus, a network may be worldwide in scope and/or extent. Likewise, sub-networks, such as may employ differing architectures or may be compliant and/or compatible with differing protocols, such as communication protocols (e.g., network communication protocols), may interoperate within a larger network. Various types of devices may be made available so that device interoperability is enabled and/or, in at least some instances, may be transparent to the devices. In this context, the term transparent refers to communicating in a manner so that communications may pass through intermediaries, but without the communications necessarily specifying one or more intermediaries, such as intermediate devices, and/or may include communicating as if intermediaries, such as intermediate devices, are not necessarily involved. For example, a router may provide a link between otherwise separate and/or independent LANs. In this context, a private network refers to a particular, limited set of network devices able to communicate with other network devices in the particular, limited set, such as via signal packet transmissions, for example, without a need for re-routing and/or redirecting such communications. A private network may comprise a stand-alone network; however, a private network may also comprise a subset of a larger network, such as, for example, without limitation, the Internet. Thus, for example, a private network "in the cloud" may refer to a private network that comprises a subset of the Internet, for example. Although signal packet transmissions may employ intermediate devices to exchange signal packet transmissions, those intermediate devices may not necessarily be included in the private network by not being a source or destination for one or more signal packet transmissions, for example. As another example, a logical broadcast domain may comprise an example of a private network. It is understood in this context that a private network may provide outgoing communications to devices not in the private network, but such devices outside the private network may not direct inbound communications to devices included in the private network.

The Internet refers to a decentralized global network of interoperable networks, including devices that are part of those interoperable networks. The Internet includes local area networks (LANs), wide area networks (WANs), wireless networks, and/or long-haul public networks that, for example, may allow signal packets to be communicated between LANs. The term world wide web (WWW) and/or similar terms may also be used to refer to the Internet. Signal packets, also referred to as signal packet transmissions, may be communicated between nodes of a network, where a node may comprise one or more network devices, for example. As an illustrative example, but without limitation, a node may comprise one or more sites employing a local network address. Likewise, a device, such as a network device, may be associated with that node. A signal packet may, for example, be communicated via a communication channel or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc. that may, for example, route a signal packet in accordance with a target address and availability of a network path of network nodes to a target address.

Physically connecting portions of a network via a hardware bridge, as one example, may be done, although other approaches also exist. A hardware bridge, however, may not typically include a capability of interoperability via higher levels of a network protocol. A network protocol refers to a set of signaling conventions for communications between or among devices in a network, typically network devices, but may include computing devices, as previously discussed; for example, devices that substantially comply with the protocol or that are substantially compatible with the protocol. Typically, a network protocol has several layers. These layers may be referred to here as a communication stack. Various types of communications may occur across various layers. For example, as one moves higher in a communication stack, additional functions may be available by transmitting communications that are compatible and/or compliant with a particular network protocol at these higher layers. A network may be very large, such as comprising thousands of nodes, millions of nodes, billions of nodes, or more, as examples.

Certain media networks, such as the Yahoo!™ network, for example, may be increasingly seeking ways to attract users to their networks and/or to retain users within their networks for extended periods of time. Media networks may, for example, comprise an Internet website or group of websites having one or more sections. For instance, the Yahoo!™ network includes websites located within different categorized sections, such as sports, finance, current events, games, matters of local interest, to name just a few non-limiting examples among a variety of possible examples.

To attract and/or retain users within its network, Yahoo!™ and/or other media networks may continually strive to provide content relating to categorized and/or localized sections that may be interesting, relevant, and/or of use to users. To further attract and/or retain users within its network, Yahoo!™ and/or other media networks may continually endeavor to increase ease-of-use for its services, which may include use of search engines, instant messaging services, electronic mail, access to premium and/or specialized content, and so forth. Providing relevant content in a manner that affords greater ease-of-use may permit a media network to increase its user base, which may allow the media network to become more valuable to potential advertisers. Thus, as many advertisers may be inclined to pay more money and/or provide other considerations to a media network in return for advertising to users, for example, via that media network, its partners, and/or subsidiaries. In this context, the term "content" includes, as examples, images, video, audio, text, and/or multimedia, such in the form of stored physical (e.g., memory) states or in the form of electronic signals, for example.

As a way of illustration, a "mobile device," may refer to, for example, a cellular telephone, a smart phone, a personal digital assistant, a wearable computer, a wrist phone, a laptop computer, a personal entertainment system, a tablet personal computer, a personal audio and/or video device, a personal navigation device, as well as other types of mobile or at least occasionally mobile computing and/or network devices. It should be appreciated, however, that these are merely examples of mobile devices that may be used, at least in part, to implement one or more services described herein, such as instant messaging, electronic mail, consuming (e.g., viewing, listening to, or otherwise experiencing) premium content, for example, and that claimed subject matter is not limited in this respect. To permit a mobile device to perform one or more services, a server, for example, may perform one or more operations based, at least in part, on executable instructions (e.g., capable of being executed by a processor or other computing device), such as software and/or firmware, for example. It is noted that terms, such as "operation," and "function," and/or similar terms may be used interchangeably in this context.

As the term may be used herein, a mobile device may transmit one or more "individual-specific" parameters to a media network, for example. An "individual-specific" parameter and/or similar terms may refer to an identifier specific or particular to an individual and/or to his or her mobile device, such as, for example, a mobile account identifier. Thus, for example, for mobile devices comprising mobile telephones (e.g. smartphones), an individual-specific parameter may comprise a telephone number, and/or other parameter of a cellular mobile telephone such as, for example, an International Mobile Subscriber Identity (IMSI), a Mobile Subscriber Integrated Services Digital Network-Number (MSISDN), and/or the like. In some embodiments, an individual-specific parameter may comprise a first/last name, post office address, etc., of an individual operating a mobile device, for example. In particular embodiments, an individual-specific parameter may comprise a logical address, an Internet Protocol (IP) address, and/or the like. However, these are merely examples provided as illustrations. Furthermore, claimed subject matter is not intended to be limited to illustrative examples, but rather, is intended to embrace any type of individual-specific parameter that may be associated with a particular mobile device and/or its user, without limitation. It is noted that while individual-specific parameters may in some cases be unique, such as a mobile telephone number, for example, or an IP address, this is not generally a requirement. For example, date of birth and/or name may not be unique, as examples. While any given individual-specific parameter may not be unique by itself, it is expected that several parameters together may form a unique, such as to designate a particular user and/or a particular account, for example.

As the term is used herein, an "Internet service", an "Internet-type service," and/or similar terms refer to a service capable of being accessed via a communications and/or computing network, such as the Internet, a wireless cellular network, etc., as examples, other than directly relating to purchase and/or sale of merchandise to or from an end user. Accordingly, an Internet service may comprise sending and/or receiving instant messages comprising electronic text, video, multimedia, and/or other content. An Internet service may also comprise sending and/or receiving of electronic mail, and/or providing, including providing access to (e.g., making accessible), particular forms of content such as audio content, video content, and/or multimedia content, etc. An Internet service may also refer to providing, including providing access to (e.g., making accessible), content, such as instructional advice, including financial guidance, legal advice, technical assistance, medical opinions, navigation and/or route planning, and/or the like, for example.

In embodiments, registering for sets of Internet-type services, such as instant messaging, access to electronic mail, access to particular content, and so forth, may take place on a "progressive" basis. Progressive registration for Internet service sets may involve one or more network devices, such as servers, for example, providing access to sets of Internet services responsive to mobile device users supplying one or more individual-specific parameters, such as, for example, in an embodiment, one or more parameters intended to be of a level at least roughly commensurate with a level of service being sought. In a non-limiting example, responsive to initiating an application that operates on a mobile device, a server device, for example, may request a mobile device to identify itself using a mobile account identifier for the mobile account. Responsive to registering a mobile device with a server device using only a mobile account identifier, for example, a server device may permit a mobile device to utilize one or more services within an initial set of Internet services provided, at least in part, by a server device. Thus, for example, a mobile device user registering to utilize an instant messaging service, such as by providing only a cellular telephone number to a server device, for example, may be permitted to utilize other services within an initial set of Internet services that includes an instant messaging service.

In embodiments, Internet services may be enabled using a mobile device by way of an application program interface, in which software program applications, for example, directly and/or indirectly, interact with one another. In other embodiments, Internet services may be enabled, at least in part, by way of a web interface, in which a software browser operates on a mobile device to perform some or all client functions, for example. Again, these are merely examples provided as illustrations. Furthermore, claimed subject matter is not intended to be limited to illustrative examples, but rather, is intended to embrace a host of possible implementations, including combinations thereof.

In embodiments, a mobile device may progressively register to utilize one or more Internet services of an upgraded (e.g., higher than an initial set or level) set of Internet services by providing one or more additional individual-specific parameters, again, in an embodiment, such as one or more parameters that may be at least roughly commensurate with a level of service being sought. Examples of reasons without limitation may include: improved security, added convenience and/or targeted marketing. In one example, a mobile device user seeking to utilize a set of Internet services that includes electronic mail service, may provide a first and last name of a mobile device user, for example, in addition to a previously provided mobile account identifier. In addition to being permitted to utilize services within an Internet service set that includes an additional Internet service, such as electronic mail, a mobile device user may be permitted to utilize services of previously utilized Internet service sets, such as a service set that includes, for example, access to instant messaging. Thus, as illustrated by this example, an additional individual specific parameter may be requested and, if provided, may permit access to a set of Internet services for which an additional individual specific parameter may be utilized. As yet another example, if access to mature content is desired, a date of birth may be requested as an additional individual-specific parameter.

By providing a capability for progressive registration for Internet-based services, a mobile device user need only supply individual-specific parameters commensurate with a set of Internet services in an embodiment. Accordingly, in one possible embodiment, an initial set of Internet services may be provided responsive to a user supplying only a mobile account identifier, such as a cellular telephone number. It is noted that in some particular situations a set may comprise a single service, of course. A mobile device user may upgrade to a larger set of Internet services by providing, for example, a single additional individual-specific parameter, such as a first and last name. Thus, in embodiments, a mobile device user may be permitted to access Internet services responsive to providing only small amounts of individual-specific parameters. As a mobile device user seeks to utilize progressive sets of Internet services, a server device may request a commensurate amount of individual-specific parameters.

In embodiments, if a mobile device user exits an Internet service, the mobile device user may return to the Internet service without being required to reenter individual-specific parameters. In embodiments, after initial registration, a mobile device user may utilize one or more Internet services, merely by selecting an icon on a mobile computing device, for example. Further, if a server device determines a presence (e.g., in a database) of individual-specific parameters associated with a mobile account identifier, such as, for example, a mobile account holder's first and last name, a mobile account holder's first/last name, etc., in an embodiment, a server device may permit access to a commensurate set of Internet services, such as electronic mail, viewing premium content, and/or the like. An embodiment may, for example, increase ease-of-use of mobile device services as well as provide additional benefits, such as examples previously discussed. Again, however, claimed subject matter is not limited to examples provided, such as for illustration.

In particular embodiments, also, via progressive registration, for example, individual-specific parameters stored in a server may permit a mobile device user to utilize sets of Internet services across a number of devices. For example, if a mobile device user supplies a mobile account identifier, such as a cellular telephone number, so that the user may view premium content on his or her smart phone, for example, the user may also be capable of viewing premium content on his or her mobile laptop computer, mobile tablet computing device, and so forth, if appropriate individual specific parameters, for example, are provided.

In particular embodiments, individual-specific parameters may be utilized by media networks in a manner that may better serve mobile device users. For example, if a mobile device user provides a zip code, a media network may be capable of directing relevant advertisements, which may comprise coupons, special offers, discounts, for nearby merchants. Individual-specific parameters comprising demographic information (e.g., gender, age group, etc.) may enable a media network to direct beneficial age-appropriate advertisements, for example. It should be noted, again, that individual-specific parameters may be utilized to provide additional benefits for mobile device users; however, claimed subject matter is not limited to illustrative examples provided, for example.

In particular embodiments, a mobile device may downgrade or regress (e.g., regressively register) from a set of Internet services, which may, in an embodiment, for example, bring about a server and/or similar device deleting at least some individual-specific parameters. Thus, if a mobile device user no longer wishes to utilize an electronic mail account or no longer has a desire for access to premium content, for example, certain Internet services may be deactivated. At a later time, however, if a mobile device user wishes to reacquire one or more services of a set of Internet services, in an embodiment, the user may again transmit appropriate individual-specific parameters, such as commensurate for a particular level of service, to a server and/or similar device, for example. A server and/or network device, for example, responsive to receiving one or more additional individual-specific parameters, in an embodiment, may reactivate one or more services of a set of Internet services, such as by restoring the user to the state that existed at the time the service or services were ceased. Thus, in particular embodiments, for example, reactivation of one or more services of the set of Internet services may additionally comprise repopulate contact lists, for example, of a user's instant messaging contacts, a user's profile, list of favorites, and/or the like.

Thus, particular embodiments may represent an improvement over present-day approaches to mobile device service access. Present-day service access models make use of an "all or nothing" arrangement, in which a user may be either allowed or denied access to one or more Internet services. In contrast, at least some embodiments of claimed subject matter may bring about a more flexible service access model, in which mobile device users may progressively (or regressively) supply one or more individual-specific parameters, such as in an embodiment, in which the parameters are at least roughly commensurate with a desired level of service. Likewise, as previously discussed, level of service may be modulated appropriately by a user. In some embodiments, for example, if a user supplies only one individual-specific parameter (e.g., mobile telephone number) or a small set of parameters, the user may be provided with a commensurately small set of Internet services. On the other hand, if a user supplies one or more additional individual-specific parameters, the user may be provided with a commensurately larger set of Internet services.

FIG. 1 is a schematic illustration 100 of a services manifest showing Internet service sets and commensurate individual-specific parameters according to an embodiment. In particular embodiments, services manifest 105 may be encoded and stored electronically using one or more memory devices, which may be accessed by a server to permit the server to provide various services to mobile devices. However, it should be noted that services manifest 105 may be accessed by computing devices and/or network device other than server devices. Again, as explained, claimed subject matter is not limited to examples provided for illustration.

Services manifest 105 shows Internet service sets 1-N, which may correspond to Internet services provided by a server device to a mobile device, for example. In particular embodiments, services manifest 105 may list, for example, three Internet service sets, five Internet service sets, seven Internet service sets, or a greater number, such as ten or twenty service sets, for example. Services provided in one or more Internet service sets may include, for example, instant messaging, access to electronic mail, access to file systems, access to premium audio, video, and/or multimedia content, navigation and route planning services, and/or a large number of other Internet services; however, as discussed, claimed subject matter is not limited in this respect.

Internet service set 1 may comprise, for example, an instant messaging service, which may be accessed by a mobile device by supplying, for example, a commensurate individual-specific parameter group 101 (e.g., mobile account identifier). Additional Internet services, such as electronic mail, for example, may be provided to a mobile device responsive to a mobile device user providing commensurate individual-specific parameters 102 (e.g., user first/last name in addition to a cellular telephone number). As shown in FIG. 1, access to Internet service set 2 permits access to services within lower-level Internet service sets, such as Internet service set 1. Likewise, Internet service set N shows that additional services may be provided to a mobile device responsive to providing additional individual-specific parameters. Additionally, in the embodiment of FIG. 1, access to higher service sets (e.g., Internet service set N) provides access to services of lower-level Internet service sets (e.g., Internet service set 1 through N−1). In the embodiment of FIG. 1, a mobile device may access services of Internet service set N by providing, for example, individual-specific parameter group 109 (e.g., cellular telephone number, user first/last name, post office address, and so forth).

Services manifest 105 may be utilized, such as by a program executed by one or more processors of a server device and/or similar device, such as to receive and/or transmit electrical signals to and/or from database 110. It is noted therefore, that services manifest 105 and its content, such as a list of individual specific parameters associated with various levels of service, may be distinct from database 110, as illustrated by FIG. 1.

In particular embodiments, database 110 may store particular individual-specific parameters (e.g., attributes), such as cellular telephone numbers of individual mobile device users, electronic mail addresses for users, contact lists, address books, and so forth. In certain embodiments, if a mobile device user downgrades or regresses from an Internet service set, which may indicate, for example, that a user no longer wishes to access services of a particular set of Internet services, one or more individual-specific parameters of a group may be deleted from database 110. Thus, for example, if a mobile device user is no longer interested in accessing electronic mail using a mobile computing device, a user may resign from, for example, Internet service set 2. Downgrading or regressing from Internet service set 2 may give rise to a server device deleting, for example, a first/last name from database 110. Of course, as previously described, in an embodiment, a user may reacquire one or more Internet services of a particular Internet service set by again providing a group of individual-specific parameters for an Internet service set in accordance with services manifest 105. For example, in an embodiment, a user may be returned to a state prior to ceasing of the one or more Internet services.

As prior discussion illustrates, deletion from database 110 may not in an embodiment necessarily affect services manifest 105; however, it is noted, that services manifest 105 may likewise be modified in an embodiment. For example, if it were considered desirable to add another individual specific parameter for a particular level of service or if it were considered desirable to remove an individual specific parameter presently specified to receive a particular level of service, in an embodiment, a modification to services manifest 105 may result in implementation of a change. Likewise, depending at least in part on particulars of an embodiment, a change, if implemented, may affect an entire computing and/or communications network or particular portions intended to be affected.

Figure 2:
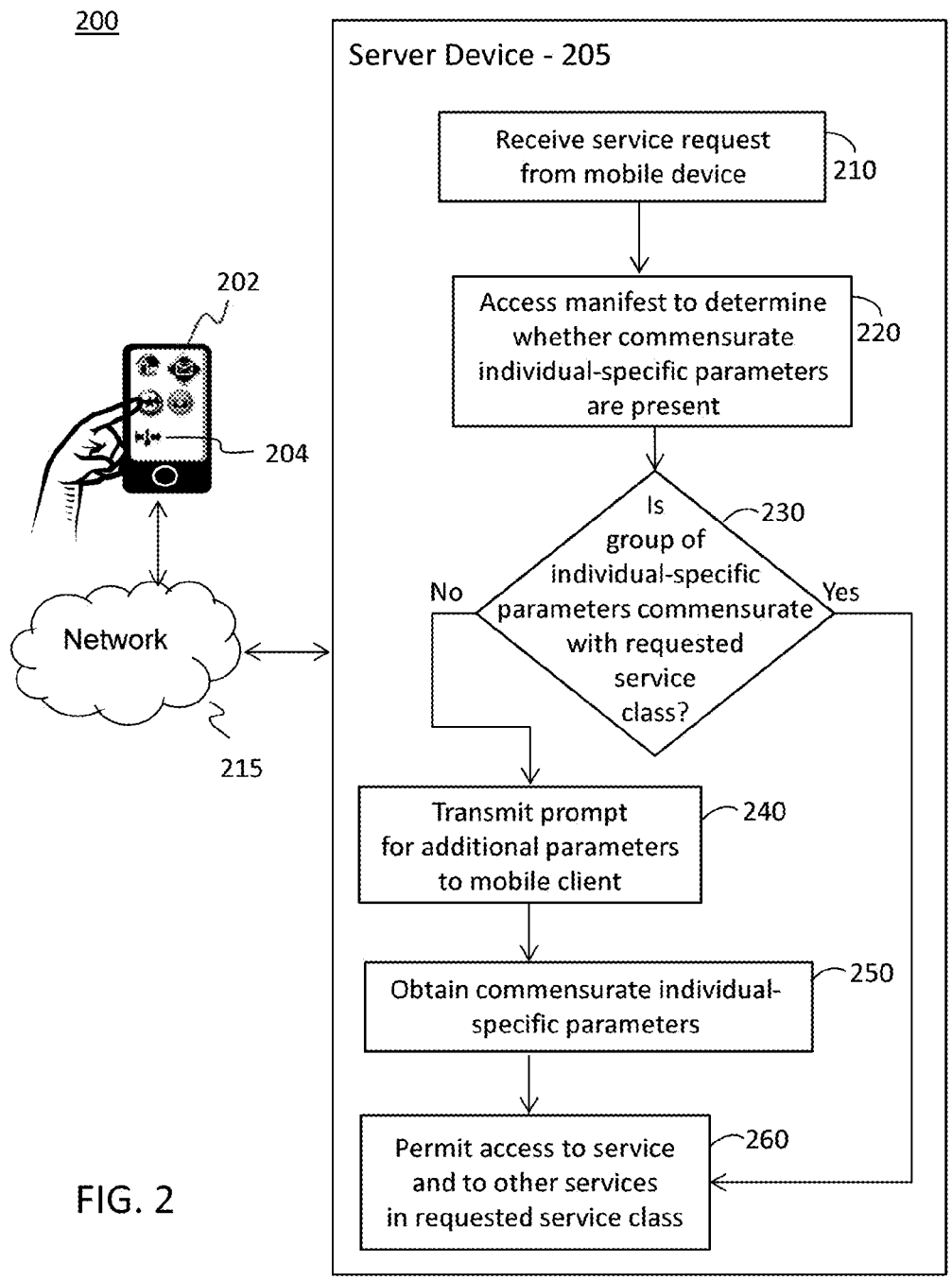
FIG. 2 is a schematic diagram showing a mobile device communicating with a server device to obtain services of Internet service set according to an embodiment.

FIG. 2 is a schematic diagram 200 showing a mobile device communicating with a server device to obtain services of an Internet service set according to an embodiment. Example implementations, such as those described in a method, such as embodied as FIG. 2, and others herein, may include blocks in addition to those shown and described as being performed by server device 205, fewer blocks, blocks occurring in an order different than may be identified, or any combination thereof. In FIG. 2, a user of mobile device 202 is shown interacting with display device 204 to select one or more icons rendered using device 204. In some embodiments, icons displayed using display device 204 may represent applications, for example, that may initiate operation using mobile device 202 by merely tapping one or more icons. It should be noted that applications may be initiated by way of other interactions, such as with a mobile device (e.g., 202), such as actuating one or more buttons, one or more switches, one or more selectors, and so forth, and claimed subject matter is intended to embrace all approaches to user interaction without limitation including, for example, speaking, touching, actuating, swiping, etc.

Responsive to a user selecting one or more icons displayed using display 204, mobile device 202 may generate wireless signals, for example, that may be transmitted via network 215 to server device 205. Of course, network 215 is intended to depict any communications and/or computing network, including the Internet, a cellular network, the public switched telephone network, a private network and/or any combinations thereof. Although only a single server device 205 is shown in FIG. 2, in certain embodiments, server device 205 may represent a group of cooperating server devices and/or other devices, which may number into the dozens, hundreds, thousands, and so forth. Thus, claimed subject matter is not limited to any particular number and/or type of devices.

At block 210, a computing and/or network device, such as, for example, server device 205, may receive one or more service requests from mobile device 202. At block 220, server device 205 may access a manifest, such as services manifest 105 of FIG. 1, to determine, in an embodiment, whether individual-specific parameters commensurate with an Internet service set have previously been made available to server device 205. In at least one embodiment, block 220 may involve server 205 determining that, for example, mobile device 202 may access a particular service, such as an instant messaging service, for example, if server device 205 is in possession of a group of individual-specific parameters, such as, for example, a cellular telephone number corresponding to a mobile device 202. Accordingly, responsive to determining individual-specific parameters for mobile device 202, which may involve server device 205 accessing a database of individual-specific parameters, server device 205 may execute block 230. Server device 205 may determine if individual-specific parameters related to client mobile 202 are available using any one of a host of possible approaches, which may or may not include querying one or more databases, for example. Again, claimed subject matter is not limited to illustrative examples.

In an embodiment, responsive to determining that commensurate individual-specific parameters for a requested Internet service set are accessible to server device 205, block 260 may be performed, in which server device 205 may permit mobile device 202 to access a requested service. In particular embodiments, server device 205 may permit mobile device 202 to access potentially all other services of an Internet service set that includes the requested service, for example. If, responsive to determining that server 205 does not have access to individual-specific parameters commensurate with a requested Internet service set, such as at block 230, server device 205 may execute block 240. At block 240, server device 205 may transmit one or more requests, by way of network 215, for example, which may indicate to a user of mobile device 202 that additional individual-specific parameters may be requested by server device 205. Responsive to receipt of one or more prompts from server device 205, for example, a user of mobile device 202 may transmit additional individual-specific parameters to server device 205.

At block 250, server device 205 may obtain additional individual-specific parameters which may, for example, form a complete group of individual-specific parameters for a particular set of Internet services. In particular embodiments, block 250 may involve, for example, authenticating one or more individual-specific parameters. Thus, in one possible example, if mobile device 202 represents a smart phone, server device 205 may request that the user authenticate a telephone number by entering a text string, for example, transmitted from server device 205 to the mobile device. Responsive to receipt of a text string, server device 205 may compare a transmitted text string with a text string received from mobile device 202 to determine agreement between or among transmitted and received text strings. Authentication of individual-specific parameters may be accomplished using other techniques, and claimed subject matter is intended to embrace any and all such authentication techniques.

Responsive to authentication, for example, server device 205 may determine that a complete group of individual-specific parameters for a particular set of internet services has been obtained. Accordingly, server device 205 may permit access to a requested service, such as at block 260. In at least one embodiment, server device 205 may permit access to all services of an Internet service set that includes a requested service, for example. It is noted that depending at least in part on particulars of an embodiment, authentication may or may not be repeated in connection with a user seeking a progressively higher (e.g., increased) level of service.

Figure 3:
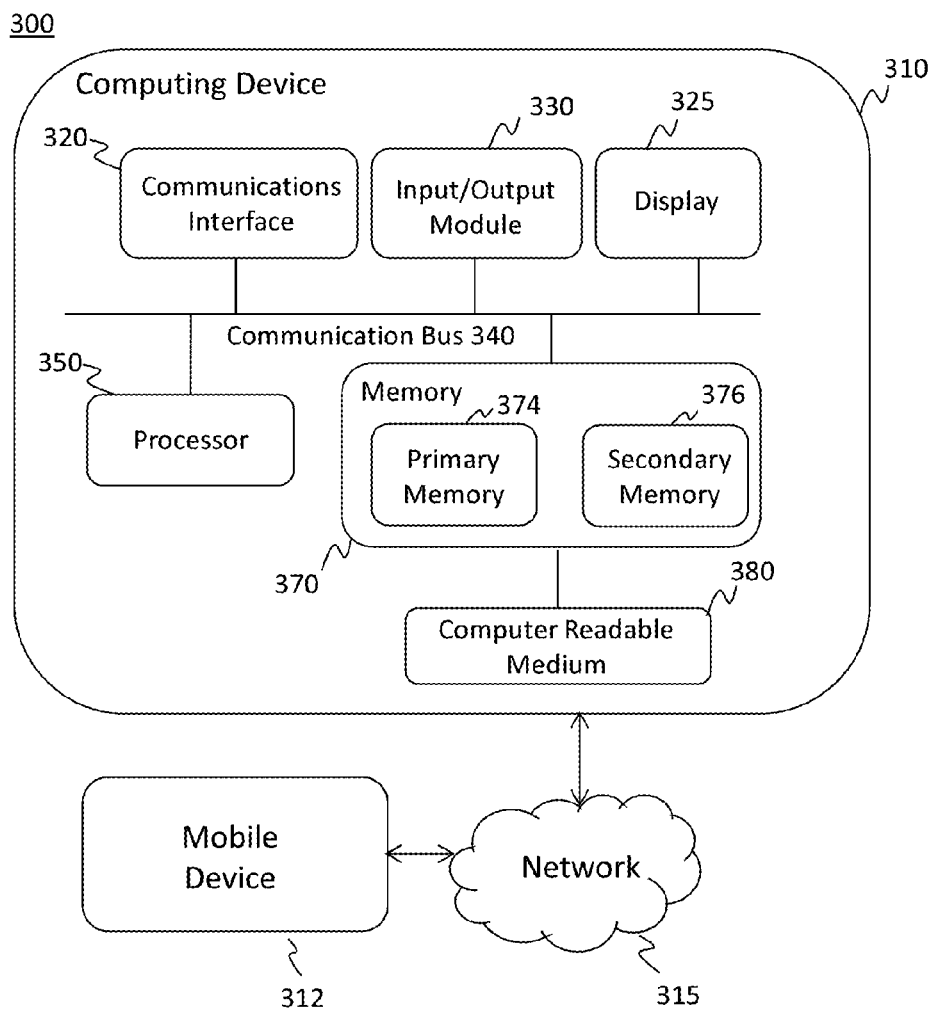
FIG. 3 is a schematic diagram of a computing platform that may be employed according to an embodiment.

For purposes of illustration, FIG. 3 is a schematic diagram 300 of a computing platform that may be employed for providing services to mobile device users based, at least in part, on individual-specific parameters according to an embodiment. A computing platform, such as that embodied in FIG. 3 may comprise computing device 310 that may be employed to perform operations such as, for example, described herein. In FIG. 3, computing device 310 may interface with mobile device 312, which may comprise features of a cellular telephone, a smart phone, a personal digital assistant, a wearable computer, a wrist phone, a laptop computer, a personal entertainment system, a tablet personal computer, a personal audio and/or video device, a personal navigation device, as well as other type of mobile or at least occasionally mobile computing device, for example.

Communications interface 320, processor 350, and memory 370, which may comprise primary memory 374 and secondary memory 376, may communicate by way of communication bus 340, for example. In FIG. 3, computing device 310 may store various forms computer-implementable instructions, by way of input/output module 330, for example, such as those that may be operative as, which may, for example, receive requests for services, determine if individual-specific parameters for a particular mobile device are prescribed for permitting access to a set of Internet services that includes a requested service, and so forth. Mobile device 312 may communicate with computing device 310 by way of a wired and/or wireless Internet connection via network 315, for example. Although a computing platform, such as the computing platform embodied in FIG. 3 shows the above-identified components, claimed subject matter is not limited to computing platforms having only these components as other implementations may include alternative arrangements that may comprise additional components, fewer components, or components that function differently while achieving similar results. Rather, examples are provided merely as illustrations. It is not intended that claimed subject matter be limited in scope to illustrative examples.

Processor 350 may be representative of one or more circuits, such as digital circuits, to perform at least a portion of a computing procedure or process. By way of example but not limitation, processor 350 may comprise one or more processors, such as controllers, microprocessors, microcontrollers, application specific integrated circuits, digital signal processors, programmable logic devices, field programmable gate arrays, and the like, or any combination thereof. In implementations, processor 350 may perform signal processing to manipulate signals and/or states or to construct signals and/or states, for example.

Memory 370 may be representative of any storage mechanism. Memory 370 may comprise, for example, primary memory 374 and secondary memory 376, additional memory circuits, mechanisms, or combinations thereof may be used. Memory 370 may comprise, for example, random access memory, read only memory, or one or more data storage devices or systems, such as, for example, a disk drive, an optical disc drive, a tape drive, a solid-state memory drive, just to name a few examples. Memory 370 may be utilized to store a program, as an example. Memory 370 may also comprise a memory controller for accessing computer-readable medium 380, which may implement a manifest, which may comprise a listing of Internet service sets and individual-specific parameters needed to access Internet service sets. Computer-readable medium 380 may additionally implement a database, such as database 110, which may comprise a listing of individual-specific parameters of various individual mobile device users along with commensurate sets of Internet services. Under direction of processor 350, memory, such as cells storing physical states, representing, for example, a program, may be executed by processor 350 and generated signals may be transmitted via the Internet, for example. Processor 350 may also receive digitally encoded signals from computing device 310.

Network 315 may comprise one or more communication links, processes, and/or resources to support exchanging communication signals between a mobile device and server, which may, for example, comprise one or more servers (not shown). By way of example, but not limitation, network 315 may comprise wireless and/or wired communication links, telephone or telecommunications systems, Wi-Fi networks, Wi-MAX networks, the Internet, the web, a local area network (LAN), a wide area network (WAN), or any combination thereof.

The term "computing platform," as used herein, refers to a system and/or a device, such as a computing device, that includes a capability to process and/or store data in the form of signals and/or states. Thus, a computing platform, in this context, may comprise hardware, software, firmware, or any combination thereof (other than software per se). Computing device 310, as depicted in FIG. 3, is merely one such example, and claimed subject matter is not limited to this particular example. For one or more embodiments, a computing platform may comprise any of a wide range of digital electronic devices, including, but not limited to, personal desktop or notebook computers, high-definition televisions, digital versatile disc (DVD) players and/or recorders, game consoles, satellite television receivers, cellular telephones, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 370 may store cookies relating to one or more users and may also comprise a computer-readable medium that may carry and/or make accessible content, code and/or instructions, for example, executable by processor 350 or some other controller or processor capable of executing instructions, for example. A user may make use of an input device and/or an output device, such as a computer mouse, stylus, track ball, keyboard, or any other device capable of receiving an input from a user.

Regarding aspects related to a communications or computing network, a wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, and/or the like, which may move freely, randomly or organize themselves arbitrarily, such that network topology may change, at times even rapidly. Wireless network may further employ a plurality of network access technologies, including Long Term Evolution (LTE), WLAN, Wireless Router (WR) mesh, or 2nd, 3rd, or 4th generation (2G, 3G, or 4G) cellular technology, or other technologies, or the like. Network access technologies may enable wide area coverage for devices, such as client devices with varying degrees of mobility, for example.

A network may enable radio frequency or wireless type communications via a network access technology, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or other, or the like. A wireless network may include virtually any type of now known, or to be developed, wireless communication mechanism by which signals may be communicated between devices, such as a client device or a computing device, between or within a network, or the like.

Communications between a computing device and a wireless network may be in accordance with known, or to be developed cellular telephone communication network protocols including, for example, global system for mobile communications (GSM), enhanced data rate for GSM evolution (EDGE), and worldwide interoperability for microwave access (WiMAX). A computing device may also have a subscriber identity module (SIM) card, which, for example, may comprise a detachable smart card that stores subscription information of a user, and may also store a contact list of the user. A user may own the computing device or may otherwise be its primary user, for example. A computing device may be assigned an address by a wireless or wired telephony network operator, or an Internet Service Provider (ISP). For example, an address may comprise a domestic or international telephone number, an Internet Protocol (IP) address, and/or one or more other identifiers. In other embodiments, a communication network may be embodied as a wired network, wireless network, or combination thereof.

A computing or network device may vary in terms of capabilities or features. Claimed subject matter is intended to cover a wide range of potential variations. For example, a network device may include a numeric keypad or other display of limited functionality, such as a monochrome liquid crystal display (LCD) for displaying text. In contrast, however, as another example, a web-enabled computing device may include a physical or a virtual keyboard, mass storage, one or more accelerometers, one or more gyroscopes, global positioning system (GPS) or other location-identifying type capability, and/or a display with a higher degree of functionality, such as a touch-sensitive color 2D or 3D display, for example.

A computing device may include or may execute a variety of now known, or to be developed operating systems, or derivatives and/or versions, including personal computer operating systems, such as a Windows, iOS or Linux, or a mobile operating system, such as iOS, Android, or Windows Mobile, or the like. A computing device may include or may execute a variety of possible applications, such as a client software application enabling communication with other devices, such as communicating one or more messages, such as via email, short message service (SMS), or multimedia message service (MMS), including via a network, such as a social network including, but not limited to, Facebook, LinkedIn, Twitter, Flickr, or Google+, to provide only a few examples. A computing device may also include or execute a software application to communicate content, such as, for example, textual content, multimedia content, or the like. A computing device may also include or execute a software application to perform a variety of possible tasks, such as browsing, searching, playing various forms of content, including locally stored or streamed video, or games such as, but not limited to, fantasy sports leagues. The foregoing is provided merely to illustrate that claimed subject matter is intended to include a wide range of possible features or capabilities.

A network including a computing device, for example, may also be extended to another device communicating as part of another network, such as via a virtual private network (VPN). To support a VPN, transmissions may be forwarded to the VPN device. For example, a software tunnel may be created. Tunneled traffic may, or may not be encrypted, and a tunneling protocol may be substantially complaint with or substantially compatible with any past, present or future versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, or another existing protocol, or another protocol that may be developed.

A network may be compatible with now known, or to be developed, past, present, or future versions of any, but not limited to the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, or X.25. A network may employ, for example, TCP/IP, UDP, DECnet, NetBEUI, IPX, Appletalk, other, or the like. Versions of the Internet Protocol (IP) may include IPv4, IPv6, other, and/or the like.

It will, of course, be understood that, although particular embodiments will be described, claimed subject matter is not limited in scope to a particular embodiment or implementation. For example, one embodiment may be in hardware, such as implemented to operate on a device or combination of devices, for example, whereas another embodiment may be, at least in part, in software. Likewise, an embodiment may be implemented in firmware, or as any combination of hardware, software, and/or firmware, for example (other than software per se). Likewise, although claimed subject matter is not limited in scope in this respect, one embodiment may comprise one or more articles, such as a storage medium or storage media. Storage media, such as, one or more CD-ROMs and/or disks, for example, may have stored thereon instructions, executable by a system, such as a computer system, computing platform, or other system, for example, that may result in an embodiment of a method in accordance with claimed subject matter being executed, such as a previously described embodiment, for example; although, of course, claimed subject matter is not limited to previously described embodiments. As one potential example, a computing platform may include one or more processing units or processors, one or more devices capable of inputting/outputting, such as a display, a keyboard and/or a mouse, and/or one or more memories, such as static random access memory, dynamic random access memory, flash memory, and/or a hard drive.

In the preceding detailed description, numerous specific details have been set forth to provide a thorough understanding of claimed subject matter. However, it will be understood by those skilled in the art that claimed subject matter may be practiced without these specific details. In other instances, methods and/or apparatuses that would be known by one of ordinary skill have not been described in detail so as not to obscure claimed subject matter. Some portions of the preceding detailed description have been presented in terms of logic, algorithms, and/or symbolic representations of operations on binary signals or states, such as stored within a memory of a specific apparatus or special purpose computing device or platform. In the context of this particular specification, the term specific apparatus or the like includes a general purpose computing device, such as general purpose computer, once it is programmed to perform particular functions pursuant to instructions from program software.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing information. It has proven convenient at times, principally for reasons of common usage, to refer to such signals and/or states as bits, data, values, elements, symbols, characters, terms, numbers, numerals, information, and/or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing device. In the context of this specification, therefore, a special purpose computer and/or a similar special purpose computing device is capable of processing, manipulating and/or transforming signals and/or states, typically represented as physical electronic and/or magnetic quantities within memories, registers, and/or other information storage devices, transmission devices, and/or display devices of the special purpose computer and/or similar special purpose computing device. In the context of this particular patent application, as mentioned, the term "specific apparatus" may include a general purpose computing device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

While there has been illustrated and/or described what are presently considered to be example features, it will be understood by those skilled in the relevant art that various other modifications may be made and/or equivalents may be substituted, without departing from claimed subject matter. Additionally, many modifications may be made to adapt a particular situation to the teachings of claimed subject matter without departing from one or more central concept(s) described herein. Therefore, it is intended that claimed subject matter not be limited to the particular examples disclosed, but that such claimed subject matter may also include all aspects falling within appended claims and/or equivalents thereof.

What is claimed is:

1. A method of progressively registering for successive sets of Internet services via a mobile device associated with a mobile account of a mobile communications service provider comprising: registering for an initial set of Internet services selected from the successive sets of Internet services by only providing a mobile account identifier for the mobile account; receiving Internet services responsive to the registering, the received Internet services being provided according to a services manifest specifying a plurality of progressive sets of Internet service sets commensurate with a specified one or more individual-specific parameters; and providing only one additional individual-specific parameter to register for an additional set of Internet services selected from the successive sets of Internet services.

2. The method of claim 1, wherein the progressively registering further comprises:
transmitting the mobile account identifier.

3. The method of claim 2, wherein the mobile account identifier comprises a mobile phone number.

4. The method of claim 2, further comprising:
transmitting a message using the mobile account for authentication.

5. The method of claim 1, wherein the initial set of Internet services comprises an instant messaging service.

6. A method of providing progressive sets of services via a mobile device associated with a mobile account of a mobile communications service provider comprising:
registering a user of the mobile device for an initial set of Internet services responsive to receipt of only a mobile account identifier for the mobile account; accessing, responsive to the registering, a services manifest specifying one or more individual-specific parameters and specifying a plurality of progressive sets of Internet service sets commensurate with the specified one or more individual-specific parameters, the mobile device providing only one additional individual-specific parameter to register for an additional set of Internet services.

7. The method of claim 6, wherein the mobile account identifier corresponds to a mobile phone number.

8. The method of claim 6, further comprising:
deleting one or more individual-specific parameters responsive to receipt of a mobile device user downgrading from a service level of a set of Internet services.

9. An article comprising: a non-transitory storage medium comprising machine-readable instructions stored thereon executable by a special-purpose computing apparatus to: provide access to an initial set of Internet services responsive to registration of a mobile device via only an identifier for a mobile account; provide the mobile device with Internet services to accord with a services manifest to specify one or more individual-specific parameters and to specify a plurality of progressive sets of Internet service sets commensurate with the specified one or more individual-specific parameters; and provide access to an additional set of Internet services, the additional set of Internet services to include the initial set of Internet services, the access to be provided responsive to receipt of only an additional individual-specific parameter.

10. The article of claim 9, wherein the mobile account identifier comprises a mobile telephone number.

11. The article of claim 10, wherein the machine-readable instructions are further executable to:
authenticate the mobile telephone number via a comparison of a second message received from the mobile device with a first message previously transmitted to the mobile device.

12. The article of claim 9, wherein the additional individual-specific parameter comprises a user name identifier.

13. The article of claim 9, wherein the additional individual-specific parameter comprises an email address.

14. The article of claim 9, wherein the mobile device comprises a smart phone.

* * * * *